Aug. 14, 1945.  C. E. PETERSON  2,382,440
CUTTING IMPLEMENT
Filed March 30, 1944
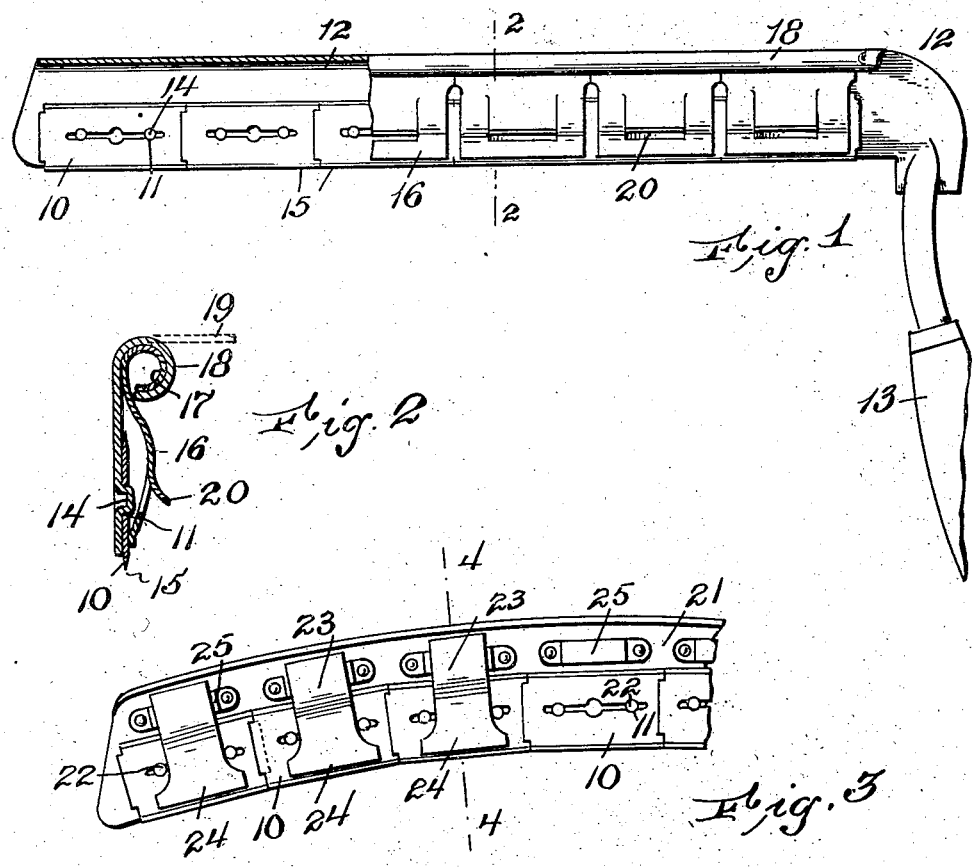
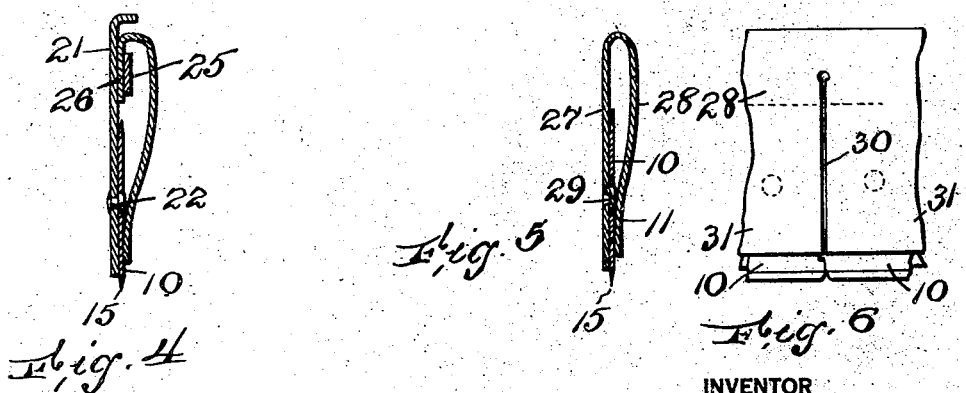
INVENTOR
Carl E. Peterson
BY
ATTORNEY.

Patented Aug. 14, 1945

2,382,440

UNITED STATES PATENT OFFICE 2,382,440

CUTTING IMPLEMENT

Carl E. Peterson, Upper Montclair, N. J.

Application March 30, 1944, Serial No. 528,789

5 Claims. (Cl. 30—339)

This invention relates to an improved cutting implement of the type that has a relatively long cutting edge, such as exemplified by sickles, scythes and other tools and particularly those used with a swinging or sweeping motion.

The invention is designed to provide a means for utilizing used razor blades in sickles and the like and provides an easy means for inserting, removing and replacing dull and broken blades without the necessity of using tools in the lighter and smaller types.

The invention is designed to hold the blades in a train, holding them end to end, preferably slightly overlapping to provide a continuous cutting edge, and also to hold them in place in a way to allow any blade in the train to be removed and replaced.

The invention is illustrated in the accompanying drawing, in which, Figure 1 is a side view, partly broken away, illustrating an implement embodying the invention. Figure 2 is a section on line 2—2 in Figure 1. Figure 3 is a side view of a modified form of implement embodying the invention. Figure 4 is a section on line 4—4 in Figure 3. Figure 5 is a section of another modified form and Figure 6 is a face view of the type of holder shown in Figure 5.

The invention is designed to employ used razor blades and hold them end to end to provide a continuous cutting edge. Many forms of blades can be used, but for purpose of illustration the drawing shows the blades 10 of the usual double edge type having the perforations 11 which are used for positioning the blades. The blades are arranged in a relatively long holder 12 which is provided with a suitably placed handle 13 located where it is best adapted for the use to which the implement is to be put. In the drawing the handle 13 is at one end of the implement.

The holder is provided with projections 14 arranged in a row and adapted to enter the holes 11 in the blades and thus fix them in a train and preferably slightly overlapped to provide a continuous cutting edge 15 by the substantially aligned blades. The blades are thin and the overlapping portions provide no obstacle to a free cutting or slicing motion.

In the form shown in Figures 1 and 2, the holder 12 is straight and the blades present a straight continuous cutting edge. With thin blades the blades are engaged near their cutting-edges by a holding or clamping means illustrated in this instance by the spring plates 16 that are curled over at 17 and the bead so formed is held in each plate by the crimped edge 18 of the holder by bending down the lip 19 to hold the springs firmly in place. Each spring can be raised by a finger-piece 20, preferably struck up from the spring and lifted by the finger when the blade it engages is to be removed for reversal or replacement.

Figures 3 and 4 illustrate a curved holder 21 having the projections 22 supplied by headed rivets. The blades 10 are arranged end to end with the perforations 11 placed over the pins or projections 22. In this construction the springs 23 are installed with their free ends 24 closely adjacent the cutting edges of the blades 10, the springs being removable in the clips 25 riveted or welded to the holder 21. The upper ends of the springs have return bends 26 that fit into the clips 25 and are wide enough to prevent tilting of the springs. By removing a spring, there being one for each blade, the blade underneath can be removed from the holder, either for replacement or reversal.

In Figures 5 and 6 the holder is shown as made of one strip of spring metal bent over to form a back wall 27 and a front wall 28. The back wall has projections 29 on its inner face, which position the blades 10. The front wall 28 is slitted at intervals by the cuts 30 whereby the sections 31 can be lifted far enough for a blade to be inserted or removed.

It will be evident that various modifications can be made in the details of construction without departing from the scope of the invention.

I claim:

1. A cutting implement comprising a relatively long narrow holder having projections on one face, thin perforated razor blades arranged end to end and seated on the projections, and spring means for independently engaging each blade for holding them against the holder and whereby any blade may be selectively removed from the holder.

2. A cutting implement comprising a holder adapted to receive a plurality of blades, clips fixed to said holder, springs for said blades, the upper end of each spring being provided with a return bend fitting into a clip to removably secure the spring therein, the lower ends of said springs bearing against said blades.

3. A cutting emploment adapted to receive a plurality of blades, said implement comprising a holder bent to form spaced parallel back and front walls, the front wall being slitted at intervals to define sections, each section being adapted to be lifted to permit removal and insertion of the blades between the walls.

4. A cutting implement comprising a relatively long narrow holder adapted to receive a plurality of blades, said holder having a curled longitudinal lip portion, spring plates having free edge portions adapted to normally bear on the underlying blades to hold the latter on the holder, said plates having means remote from said free edge portions adapted to be positioned in the curled lip portion of the holder and finger pieces struck up from the plates.

5. A cutting implement comprising a relatively long narrow holder adapted to receive a blade, said holder having a curled longitudinal lip portion, a spring plate provided with a beaded portion, said beaded portion adapted to be positioned in the curled lip portion of the holder, said plate having a free edge portion remote from said beaded portion adapted to normally bear on the underlying blade to hold the latter on the holder, and a finger piece struck up from the plate.

CARL E. PETERSON.